United States Patent
Ducoing et al.

(10) Patent No.: US 11,606,166 B2
(45) Date of Patent: Mar. 14, 2023

(54) TRANSMITTING AND RECEIVING DATA IN A WIRELESS COMMUNICATION NETWORK USING A COMBINATION OF REAL AND COMPLEX MODULATION TYPES

(71) Applicant: University of Surrey, Guildford (GB)

(72) Inventors: Juan Carlos De Luna Ducoing, Guildford (GB); Na Yi, Guildford (GB); Yi Ma, Guildford (GB); Rahim Tafazolli, Guildford (GB)

(73) Assignee: University of Surrey, Guildford (GB)

( * ) Notice: Subject to any disclaimer, the term of this patent is extended or adjusted under 35 U.S.C. 154(b) by 896 days.

(21) Appl. No.: 16/315,997

(22) PCT Filed: Jul. 7, 2017

(86) PCT No.: PCT/GB2017/052012
§ 371 (c)(1),
(2) Date: Jan. 7, 2019

(87) PCT Pub. No.: WO2018/007834
PCT Pub. Date: Jan. 11, 2018

(65) Prior Publication Data
US 2020/0186275 A1    Jun. 11, 2020

(30) Foreign Application Priority Data
Jul. 7, 2016 (GB) ...................................... 1611856

(51) Int. Cl.
*H04J 11/00*   (2006.01)
*H04L 1/02*    (2006.01)
(Continued)

(52) U.S. Cl.
CPC .............. *H04L 1/003* (2013.01); *H04L 1/005* (2013.01); *H04L 1/206* (2013.01); *H04L 27/04* (2013.01);
(Continued)

(58) Field of Classification Search
CPC ......... H04L 1/003; H04L 27/34; H04L 1/005; H04L 1/206; H04L 5/0007; H04L 27/04;
(Continued)

(56) References Cited

U.S. PATENT DOCUMENTS 6,185,266 B1 *  2/2001  Kuchi ................. H04B 7/0814
                                                        455/135
7,567,626 B2 *  7/2009  Hammes ................. H04L 12/16
                                                        375/322
(Continued)

FOREIGN PATENT DOCUMENTS

CN         1770644 B        1/2013

OTHER PUBLICATIONS

J. C. De Luna Ducoing, Using Real Constellations in Fully- and Over-Loaded Large MU-MIMO Systems With Simple Detection, IEEE Wireless Communications Letters, vol. 5, No. 1, Feb. 2016, p. 92.
(Continued)

*Primary Examiner* — Edan Orgad
*Assistant Examiner* — Vanneilian Lalchinthang
(74) *Attorney, Agent, or Firm* — Umberg Zipser LLP; Ryan Dean

(57) ABSTRACT

Apparatus and methods are disclosed for transmitting and receiving data in a wireless communication network. Apparatus for transmitting data in a wireless communication network comprises a real modulation branch for modulating a first segment of a bit sequence to obtain a real modulated signal, a complex modulation branch for modulating a
(Continued)

second segment of the bit sequence to obtain a complex modulated signal, a signal dividing unit configured to divide the bit sequence into a plurality of alternating first segments and second segments, and to send the first segments and the second segments to the real modulation branch and the complex modulation branch respectively, and a transmitter configured to transmit the real and complex modulated signals. Apparatus and methods are also disclosed for demultiplexing a plurality of data streams, using wide linear zero forcing with successive interference cancellation.

14 Claims, 5 Drawing Sheets

(51) Int. Cl.
*H04L 27/04* (2006.01)
*H04L 1/00* (2006.01)
*H04L 1/20* (2006.01)
*H04L 27/36* (2006.01)
*H04L 25/03* (2006.01)

(52) U.S. Cl.
CPC ........ *H04L 27/36* (2013.01); *H04L 2025/037* (2013.01); *H04L 2025/03426* (2013.01); *H04L 2025/03624* (2013.01)

(58) Field of Classification Search
CPC ............... H04L 27/36; H04L 5/005; H04L 2025/03426; H04L 2025/03624; H04L 2025/037; H04L 27/02; H04L 27/3416; H04B 7/0417
USPC ......................................................... 370/310
See application file for complete search history.

(56) References Cited

U.S. PATENT DOCUMENTS

| | | | | |
|---|---|---|---|---|
| 8,797,837 B2* | 8/2014 | Li | ............ | H04L 5/0007 |
| | | | | 370/464 |
| 9,955,469 B2* | 4/2018 | Li | ............ | H04B 7/0413 |
| 2003/0156014 A1* | 8/2003 | Kodama | ............ | H04B 3/54 |
| | | | | 375/258 |
| 2005/0129137 A1* | 6/2005 | Yamada | ............ | H04B 7/0848 |
| | | | | 375/267 |
| 2006/0116091 A1 | 6/2006 | Hammes et al. | | |
| 2010/0202386 A1* | 8/2010 | Takaoka | ............ | H04L 1/0083 |
| | | | | 370/329 |
| 2011/0280188 A1* | 11/2011 | Jeon | ............ | H04B 7/0617 |
| | | | | 370/328 |
| 2014/0341108 A1* | 11/2014 | Desai | ............ | H04W 72/0453 |
| | | | | 370/328 |
| 2015/0280796 A1* | 10/2015 | Yen | ............ | H04W 72/0453 |
| | | | | 370/294 |
| 2017/0085410 A1* | 3/2017 | Lin | ............ | H04L 5/006 |
| 2018/0083811 A1* | 3/2018 | Kumpula | ............ | H04L 25/03159 |

OTHER PUBLICATIONS

Korea Patent Office, Notice of Preliminary Rejection, dated Aug. 18, 2021.
De Luna Ducoing J C et al: "Using Real Constellations in Fully- and Over-Loaded Large MU-MIMO Systems With Simple Detection", IEEE Wireless Communications Letters, vol. 5, No. 1, Feb. 1, 2016 (Feb. 1, 2016), pp. 92-95, XP011600088, NJ, USA.
European Patent Office, PCT Search Report and Written Opinion, dated Sep. 7, 2017.
Chinese Patent Office, First Office Action, dated Mar. 25, 2021, 10 pages, computer translated.
Chinese Patent Office, First Office Action, dated Mar. 25, 2021, 10 pages.

* cited by examiner

TRANSMITTING AND RECEIVING DATA IN A WIRELESS COMMUNICATION NETWORK USING A COMBINATION OF REAL AND COMPLEX MODULATION TYPES

TECHNICAL FIELD

The present invention relates to transmitting and receiving data in a wireless communication network. In particular, the present invention relates to transmitting data using both real and complex modulation.

BACKGROUND

Many different modulation techniques have been developed for use in wireless communication networks, for example mobile telecommunication networks. Signal modulation methods can generally be categorised as real or complex, depending on the parameter that is varied when modulating a carrier signal with data to be transmitted. One example of a real signal modulation method is amplitude shift keying (ASK), in which the amplitude of a carrier signal is varied. Different amplitude levels are defined in advance, each corresponding to a different data symbol. However, ASK is relatively power-inefficient and also required the receiver to be capable of accurately measuring the received signal power.

An alternative solution is to use a complex modulation method such as quadrature amplitude modulation (QAM), in which the signal power remains constant and the phase is varied according to the data symbol to be transmitted. However, QAM suffers from the drawback that the receiver must be able to accurately determine the phase of the received signal, and is therefore highly susceptible to multipath interference. It would therefore be desirable to provide an improved modulation scheme.

The invention is made in this context.

SUMMARY OF THE INVENTION

According to a first aspect of the present invention, there is provided apparatus for transmitting data in a wireless communication network, the apparatus comprising: a real modulation branch for modulating a first segment of a bit sequence to obtain a real modulated signal; a complex modulation branch for modulating a second segment of the bit sequence to obtain a complex modulated signal; a signal dividing unit configured to divide the bit sequence into a plurality of alternating first segments and second segments, and to send the first segments and the second segments to the real modulation branch and the complex modulation branch respectively; and a transmitter configured to transmit the real and complex modulated signals.

In some embodiments according to the first aspect, the signal dividing unit is configured to obtain a metric of signal quality for a wireless communication channel between the apparatus and a receiver, and to select a bit length of each of the first segments and a bit length of each of the second segments according to the metric of signal quality. For example, the metric of signal quality may be a metric of received signal strength. In some embodiments according to the first aspect, the signal dividing unit can be configured to select one of a plurality of predefined modulation schemes according to the metric of signal quality, each of the plurality of predefined modulation schemes being associated with a different range of values of the metric of signal quality, and each of the plurality of predefined modulation schemes defining a bit length to be used for each of the first segments and a bit length to be used for each of the second segments.

In some embodiments according to the first aspect, the apparatus can be configured to determine an order in which to divide the bit sequence into the first and second segments according to signalling received from the wireless communication network.

In some embodiments according to the first aspect, the apparatus can be configured to transmit the real and complex modulated signals using time-division multiplexing, by alternately transmitting the real and complex modulated signals in the time domain.

In some embodiments according to the first aspect, the apparatus can be configured to transmit the real and complex modulated signals using frequency-division multiplexing, by transmitting the real modulated signal and the complex modulated signal on different frequencies.

In some embodiments according to the first aspect, the real modulation branch can be configured to modulate the first segments of the bit sequence using amplitude shift keying (ASK) modulation, and/or the complex modulation branch can be configured to perform quadrature amplitude modulation (QAM).

In some embodiments according to the first aspect, a plurality of devices each comprising the apparatus may form a wireless communication network in which the plurality of devices are arranged into a first group and a second group. Devices in the first group are configured to use an inverse order to devices in the second group when dividing the bit sequence, such that corresponding parts of respective bit sequences processed by devices in the first and second groups are modulated using real modulation by devices in the first group and using complex modulation by devices in the second group, or using complex modulation by devices in the first group and using real modulation by devices in the second group. The wireless communication network may further comprise an access point configured to communicate wirelessly with the plurality of devices, wherein the access point can be configured to assign each device to the first group or the second group, and to notify each device of the group to which it is assigned.

According to a second aspect of the present invention, there is provided apparatus for receiving data in a wireless communication network, the apparatus comprising: a demultiplexer configured to apply Wide Linear Zero Forcing (WLZF) with Successive Interference Cancellation (SIC) to demultiplex a plurality of received data streams; a decoder configured to decode the demultiplexed data streams; and a detector configured to detect data symbols from one of the decoded demultiplexed data streams and to signal to the demultiplexer whether detection was successful, for each one of the decoded demultiplexed data streams, wherein in response to detection being unsuccessful for one or more of the decoded demultiplexed data streams, the apparatus is configured to repeatedly perform decoding and detection on said one or more data streams until a termination condition is satisfied.

According to a third aspect of the present invention, there is provided a method of transmitting data in a wireless communication network, the method comprising: dividing a bit sequence into a plurality of alternating first segments and second segments; sending the first segments and the second segments to a real modulation branch and a complex modulation branch respectively, the real modulation branch being configured to modulate the first segments to obtain a real modulated signal and the complex modulation branch being configured to modulate the first segments to obtain a complex modulated signal; and transmitting the real and complex modulated signals.

According to a fourth aspect of the present invention, there is provided a method of receiving data in a wireless communication network, the method comprising: applying WLZF with SIC to demultiplex a plurality of received data streams; attempting to detect data symbols from the demultiplexed data streams; and determining for each one of the demultiplexed data streams whether detection was successful, wherein in response to detection being unsuccessful for one or more of the demultiplexed data streams, WLZF-SIC demultiplexing and detection is repeatedly performed on said one or more data streams until convergence on a detection result is observed for said one or more data streams.

According to a fifth aspect of the present invention, a computer-readable storage medium can be arranged to store computer program instructions which, when executed, perform a method according to third or fourth aspects.

BRIEF DESCRIPTION OF THE DRAWINGS

Embodiments of the present invention will now be described, by way of example only, with reference to the accompanying drawings, in which.

DETAILED DESCRIPTION

Figure 1:
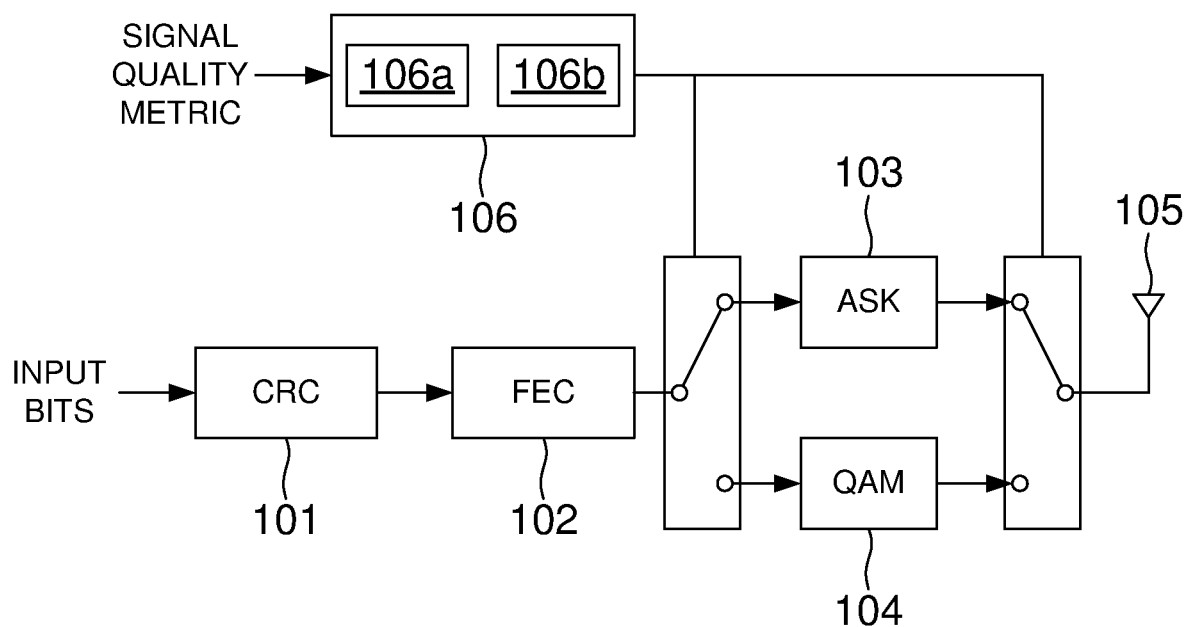
FIG. 1 illustrates apparatus for transmitting data in a wireless communication network, according to an embodiment of the present invention.

In the following detailed description, only certain exemplary embodiments of the present invention have been shown and described, simply by way of illustration. As those skilled in the art would realize, the described embodiments may be modified in various different ways, all without departing from the scope of the present invention. Accordingly, the drawings and description are to be regarded as illustrative in nature and not restrictive. Like reference numerals designate like elements throughout the specification.

Embodiments of the present invention provide a novel modulation technique, hereinafter referred to as A-QAM, which can be utilised to enable scalable multiuser signal de-multiplexing in the context of multiuser multiple-input multiple-output (MU-MIMO) systems. An A-QAM transceiver comprising apparatus for transmitting data in a wireless communication network is schematically illustrated in FIG. 1, according to an embodiment of the present invention. As shown in FIG. 1, in the present embodiment an input bitstream is passed through a cyclic redundancy check (CRC) block 101 and a forward error correction (FEC) block 102 to obtain a coded bitstream which includes CRC and FEC codes. In other embodiments the CRC and/or FEC blocks may be omitted, for example in scenarios where there is a low probability of transmission errors occurring.

In addition to the CRC block 101 and the FEC block 102, the apparatus further comprises a real modulation branch 103 for modulating a first segment of the coded bit sequence to obtain a real modulated signal, and a complex modulation branch 104 for modulating a second segment of the coded bit sequence to obtain a complex modulated signal. In the present embodiment the real modulation branch 103 is configured to apply ASK modulation and the complex modulation branch 104 is configured to perform QAM. However, in other embodiments other real and complex modulation techniques may be used. The skilled person will be familiar with the principles of ASK and QAM modulation, and a detailed description will not be provided here so as to avoid obscuring the present inventive concept.

As shown in FIG. 1, the apparatus further comprises a signal dividing unit 106 which is configured to divide the coded bit sequence into a plurality of alternating first segments and second segments, and to send the first segments and the second segments to the real modulation branch 103 and the complex modulation branch 104 respectively. The signal dividing unit can switch between the real modulation branch 103 and the complex modulation branch 104 to select an appropriate branch to modulate input bits. Finally, the apparatus comprises a transmitter 105 in the form of a wireless antenna capable of transmitting the real and complex modulated signals. In some embodiments the transmitter 105 may be a multi-antenna array.

In some embodiments the transmitter 105 may be configured to transmit the real and complex modulated signals using time-division multiplexing, by alternately transmitting the real and complex modulated signals in the time domain. Alternatively, in other embodiments the transmitter 105 may be configured to transmit the real and complex modulated signals using frequency-division multiplexing, by transmitting the real modulated signal and the complex modulated signal on different frequencies. A-QAM and similar interleaved real/complex modulation techniques can therefore be applied to both single carrier and multicarrier transmission.

An example of dividing a bit sequence into first and second segments will now be described to aid understanding of the present inventive concept. An input bit sequence moo nom can be partitioned into four segments as follows: '01', '001', '10', '101'. The signal dividing unit 106 controls a first switch to send the bit segments '01' and '10' to the ASK branch 103, and to send the bit segments '001' and '111' to the QAM branch 104. The ASK branch 103 outputs two 4-ASK symbols, which can be denoted as ASK1 and ASK2, and the QAM branch 104 outputs two 8-QAM symbols, which can be denoted as QAM1 and QAM2. Then, the signal dividing unit 106 controls a second switch after the modulation branches 103, 104 to arrange the output symbols in the order ASK1, QAM1, ASK2, QAM2. The real and complex modulated output symbols are sent to the antenna, which transmits the real and complex modulated signals to the receiver.

In this example the bit segments '01' and '10' can both be referred to as first segments, since these are modulated using real modulation. Similarly, the bit segments '001' and '111' can both be referred to as second segments, since these are modulated using complex modulation. In this example the first segments are each two bits long since the real modulation branch 103 is configured to apply 4-ASK, and the second segments are each three bits long since the complex modulation branch 104 is configured to apply 8-QAM. However, embodiments of the present invention are not limited to 4-ASK and 8-QAM. In other embodiments different ASK and QAM modulation schemes may be used, or modulation techniques other than ASK and QAM may be used.

In the present embodiment the signal dividing unit 106 is configured to obtain a metric of signal quality for a wireless communication channel between the apparatus and a receiver, as shown in FIG. 1, and to select a bit length of each of the first segments and a bit length of each of the second segments according to the metric of signal quality. Any suitable metric of signal quality can be used, for example the received signal strength indicator (RSSI) or the signal-to-noise ratio (SNR). In the present embodiment received signal strength is used as the signal metric, since more complex hardware would be required to measure the SNR.

The signal dividing unit 106 is configured to select one of a plurality of predefined modulation schemes according to the metric of signal quality, each of the plurality of predefined modulation schemes being associated with a different range of values of the metric of signal quality. Each of the plurality of predefined modulation schemes defines a bit length to be used for each of the first segments and a bit length to be used for each of the second segments, and/or defines a type of modulation to be used by the real and complex modulation branches 103, 104. An optimum modulation scheme may be defined in advance for each range of values of the metric of signal quality, for example based on simulation results or real-world tests.

Although in the present embodiment the signal dividing unit 106 is configured to dynamically adapt the A-QAM modulation scheme according to the value of the signal quality metric, in other embodiments the coded bit sequence may always be divided into first and second segments in a fixed, predetermined manner. For example, the apparatus may be configured to always use real modulation for the initial segment in a bit sequence, or to always use complex modulation for the initial segment.

Furthermore, the apparatus may be configured to always use the same real and complex modulation schemes, for example 4-ASK and 8-QAM.

In the present embodiment the signal dividing unit 106 is implemented using a processing unit 106a configured to execute software instructions stored on a computer-readable storage medium 106b. In other embodiments the signal dividing unit 106 may be implemented in hardware. For example, in an embodiment in which the signal dividing unit 106 switches between the real and complex modulation branches 103, 104 in a fixed manner, the signal dividing unit 106 may be implemented using a counter which counts the number of bits sent to currently-selected modulation branch and then switches to the other modulation branch when a limit is reached, for example two bits in the case of 4-ASK or three bits in the case of 8-QAM.

Figure 2:
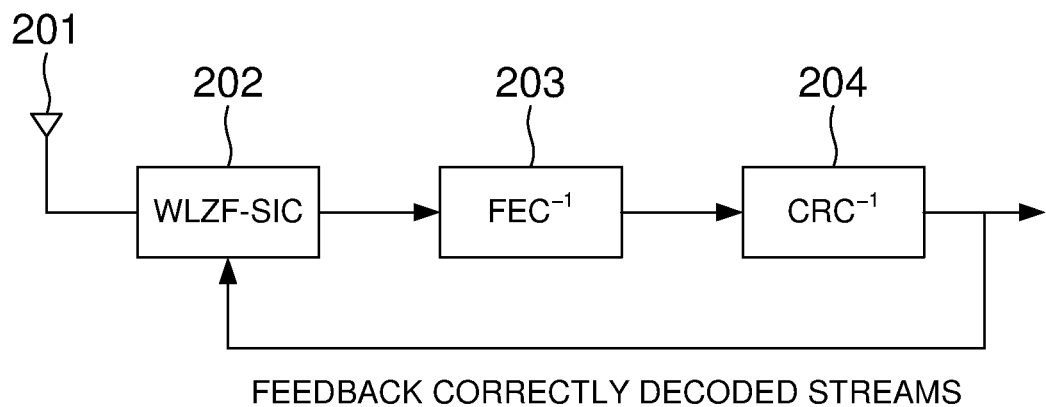
FIG. 2 illustrates apparatus for receiving data in a wireless communication network, according to an embodiment of the present invention.

Referring now to FIG. 2, apparatus for receiving data in a wireless communication network is schematically illustrated, according to an embodiment of the present invention. The apparatus comprises an antenna 201 capable of receiving the A-QAM signal transmitted by the apparatus of FIG. 1. In the present embodiment the antenna 201 receives a plurality of A-QAM signals from a plurality of transmitters. The data streams from the plurality of A-QAM signals are therefore naturally multiplexed and must be separated at the receiver. To allow the multiplexed data streams to be separated, the apparatus further comprises a demultiplexer 202 for demultiplexing a plurality of received data streams, a decoder 203 for decoding the demultiplexed data streams, and a detector 204 for detecting data symbols from the decoded demultiplexed data streams.

The demultiplexer 202 is configured to apply WLZF with SIC to demultiplex the plurality of received data streams. After attempting to detect data symbols from each data stream, the detector 204 determines for each data stream whether detection was successful, and signals to the demultiplexer 202 whether detection was successful. Any data streams which successfully passed CRC detection are subtracted from the received data stream, and the residual part is then passed through a second round of WLZF-SIC demultiplexing, decoding and detecting.

The process is repeated until a termination condition is satisfied. For example, the process may repeat up to a predefined maximum number of iterations, at which point the process terminates regardless of whether there are any data streams remaining that have not successfully passed detection. In other embodiments the process may continue until the detector 204 converges on a detection result for each of the multiplexed data streams. For example, if after the $i^{th}$ iteration N bitstreams remain unrecovered and after the subsequent $(i+1)^{th}$ iteration the N bitstreams still remain unrecovered, the receiver can determine that successful reconstruction of the N bitstreams is not possible. In this scenario, the receiver has converged on a negative detection result (detection not possible) for the N bitstreams, and the detection process can be terminated.

Figure 3:
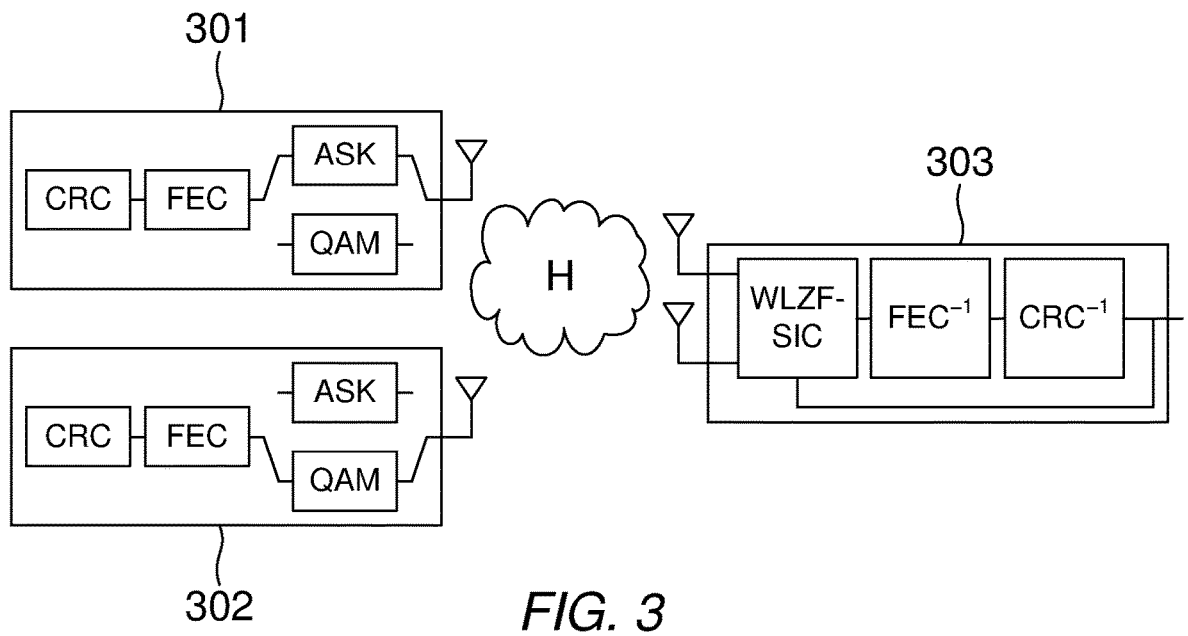
FIG. 3 illustrates a wireless communication network comprising a plurality of devices arranged into first and second groups, according to an embodiment of the present invention.

Referring now to FIG. 3, a wireless communication network comprising a plurality of devices arranged into first and second groups is schematically illustrated, according to an embodiment of the present invention. In the present embodiment only two transmitter devices 301, 302 are illustrated. The first group comprises the first device 301 and the second group comprises the second device 302. In general, any number of devices may be divided into first and second groups. That is, each of the first and second groups may include a single device or may include a plurality of devices, depending on the current network configuration. Also, in the present embodiment each device 301, 302 is shown as having a single antenna, transmitting signals to an access point 303 with a plurality of service antennas. In other embodiments each transmitter device 301, 302 may have multiple antennas, and the wireless communication network may further comprise a plurality of access points 303 linked via high-capacity backhaul.

In the present embodiment, each device 301, 302 is configured to apply A-QAM modulation as described above.

Any devices in the first group 301 are configured to place modulated symbols in the order of ASK1, QAM1, ASK2, QAM2 as described above. However, any devices 302 in the second group are configured to place modulated symbols in the inverse order QAM1, ASK1, QAM2, ASK2. In this way, corresponding parts of respective bit sequences processed by devices in the first and second groups are modulated using real modulation by devices 301 in the first group and using complex modulation by devices 302 in the second group, or using complex modulation by devices 301 in the first group and using real modulation by devices 302 in the second group.

By configuring groups of devices to use opposite modulation sequences, as described above, a MU-MIMO receiver can benefit from MIMO channel spatial diversity since ASK symbols are always present. That is, in the first time slot ASK symbols are transmitted by the first group of devices, and in the second time slot ASK symbols are transmitted by the second group of devices. Similarly, QAM symbols are always present in each time slot, improving the transmit power efficiency for each device. If all devices in the network were to use an identical modulation sequence, then in the first time slot all symbols would be ASK symbols, for example, and in the second time slot all symbols would be QAM symbols. In this way, at the first time slot the power efficiency would be reduced due to the absence of QAM symbols, and at the second time slot MIMO channel spatial diversity gain would be compromised due to the absence of ASK symbols.

In the above example, each device has a single transmit antenna. In other embodiments, devices in the wireless communication network may each include a plurality of antennas. If each device has an even number of antennas (e.g. two antennas), then the devices do not need to be divided into groups. Instead, different antennas in the same device can use inverse modulation sequences. In the two-antenna example, each device can use the modulation sequence [ASK, QAM, ASK, QAM] for the first antenna, and the inverse modulation sequence [QAM, ASK, QAM, ASK] for the second antenna. In this case, all devices use identical sequences and so the access point is not required to assign devices to different groups.

In some embodiments, the network can coordinate the pattern of the order that should be employed at each terminal. For example, in the present embodiment the access point 303 is configured to assign each device to the first group or the second group, and to notify each device of the group to which it is assigned using predefined signalling. The devices 301, 302 are configured to determine an order in which to divide the bit sequence into the first and second segments according to the signalling received from the access point 303. However, in other embodiments each device may be pre-programmed to use a specific order of real/complex modulation, such that any given device always operates in the same group.

Figure 4:
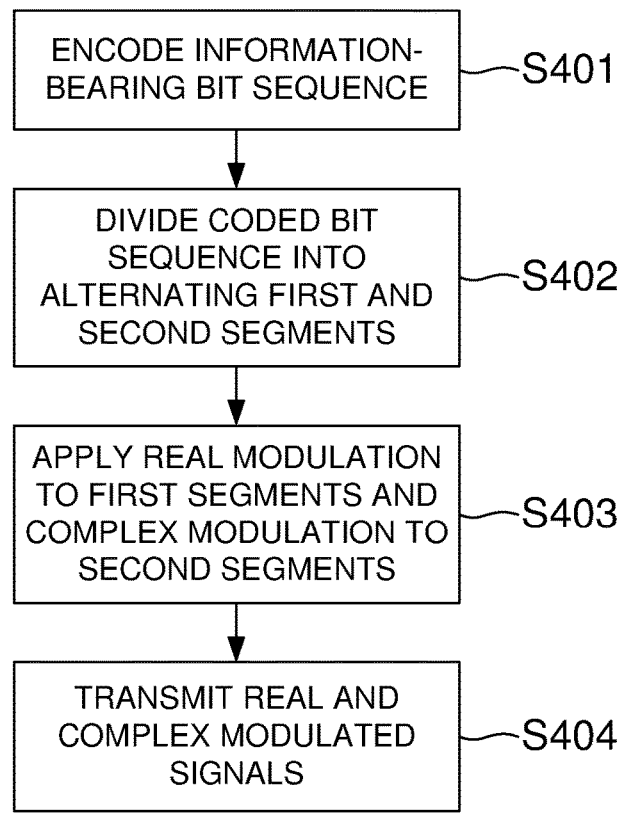
FIG. 4 is a flowchart showing a method of transmitting data in a wireless communication network, according to an embodiment of the present invention.

A method of transmitting data in a wireless communication network will now be described with reference to FIG. 4, according to an embodiment of the present invention. The method shown in FIG. 4 corresponds to the method implemented by the apparatus shown in FIG. 1.

First, in step S401 an input bit sequence is encoded, for example using CRC and FEC encoding. As described above, in some embodiments an encoding step may be omitted. Next, in step S402 the coded bit sequence is divided into a plurality of alternating first segments and second segments, and in step S403 the first and second segments are modulated using real and complex modulation respectively. In the present embodiment ASK and QAM are used. Then, in step S404 the real and complex modulated signals are transmitted.

Figure 5:
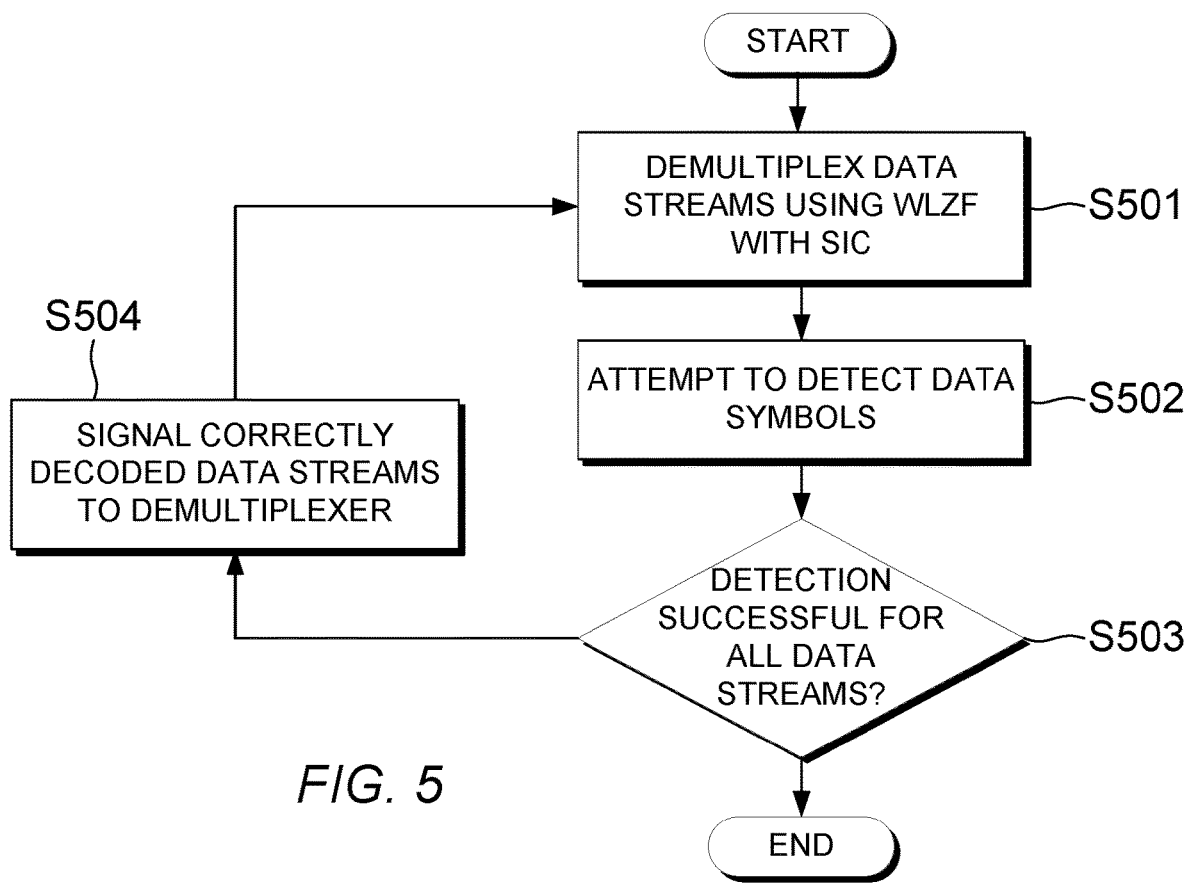
FIG. 5 is a flowchart showing a method of receiving data in a wireless communication network, according to an embodiment of the present invention.

A method of receiving data in a wireless communication network will now be described with reference to FIG. 5, according to an embodiment of the present invention. The method shown in FIG. 5 corresponds to the method implemented by the apparatus shown in FIG. 2.

First, in step S501 a plurality of multiplexed data streams are demultiplexed using WLZF with SIC. Then, in step S502 a symbol detector attempts to detect data symbols from the demultiplexed data streams. In step S503, the detector determines for each one of the demultiplexed data streams whether detection was successful. In step S503, if all data streams have successfully passed detection then the termination condition is satisfied, and the process ends.

On the other hand, if in step S503 it is determined that any data streams have failed detection, then the process proceeds to step S504. In step S504, the demultiplexer is informed which data streams were successfully detected, and removes these from the subsequent round of WLZF-SIC demultiplexing and detection. The process repeats through steps S501, S502 and S503 until all data streams have successfully passed detection or until another termination condition is satisfied, for example a preset number of iterations has been reached.

Figure 6:
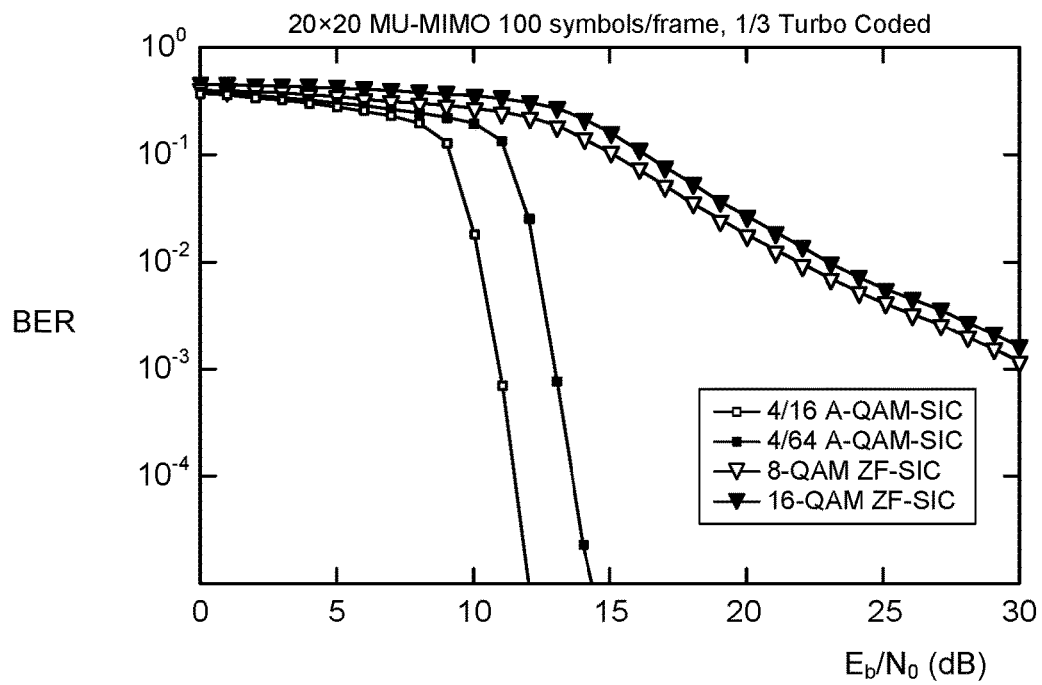
FIG. 6 is a graph comparing the performance of a system using interleaved modulation, according to an embodiment of the present invention, against that of a conventional QAM-based system.
Figure 7:
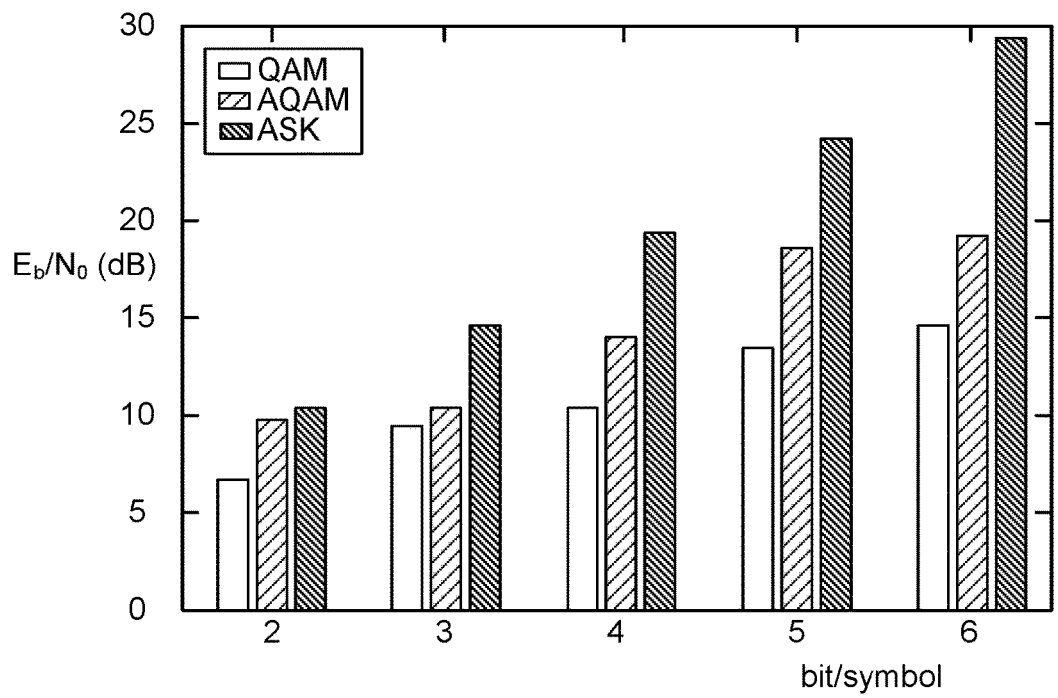
FIG. 7 is a chart plotting the transmit power $E_b/N_o$ required to achieve a given bit error rate for different symbol lengths, for an interleaved modulation method according to an embodiment of the present invention, conventional QAM, and conventional ASK.

By dividing an input bit sequence into interleaved real and complex modulated segments as described above, embodiments of the present invention can provide improved performance in comparison to prior art techniques which solely use either real modulation or complex modulation. The graph shown in FIG. 6 compares the performance of a system using interleaved A-QAM modulation, according to an embodiment of the present invention, against that of a conventional QAM-based system. As shown in FIG. 6, the interleaved A-QAM modulation method provides a substantial improvement in the bit error rate (BER) in comparison to conventional QAM. Also, as shown in FIG. 7, A-QAM needs much less transmit power than ASK in order to reach the same bit error rate. This is referred to as the modulation efficiency.

Figure 8:
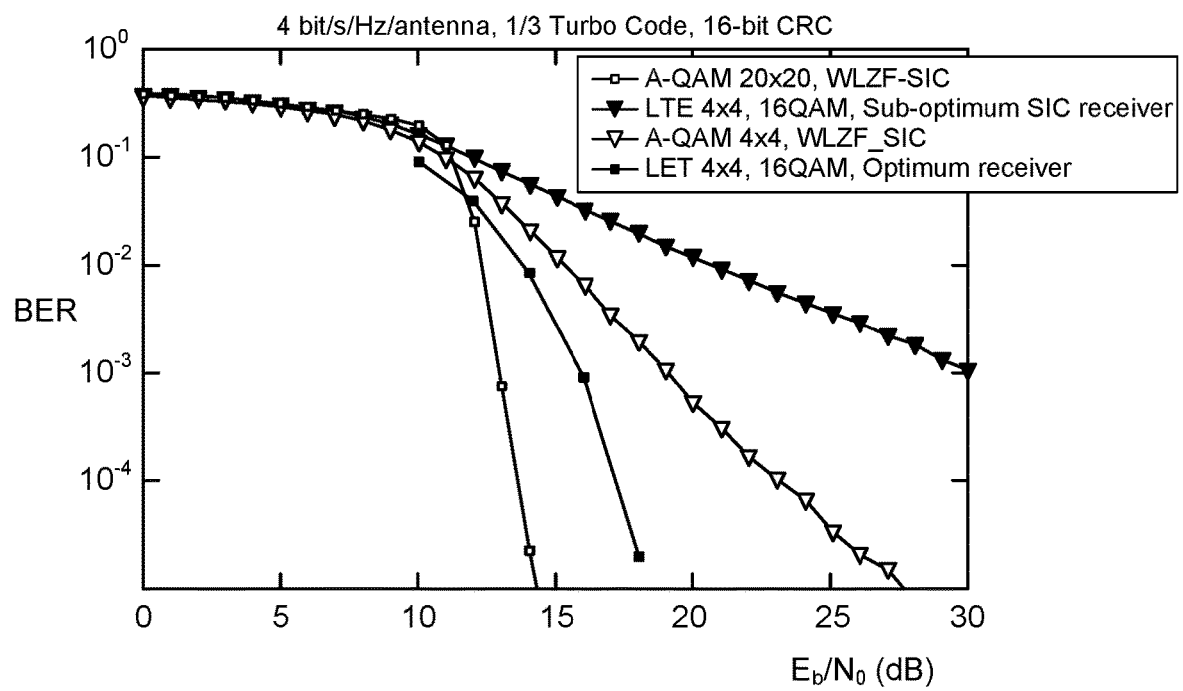
FIG. 8 is a graph comparing the performance of a receiver using WLZF-SIC according to an embodiment of the present invention, against that of a conventional QAM receiver.
Figure 9:
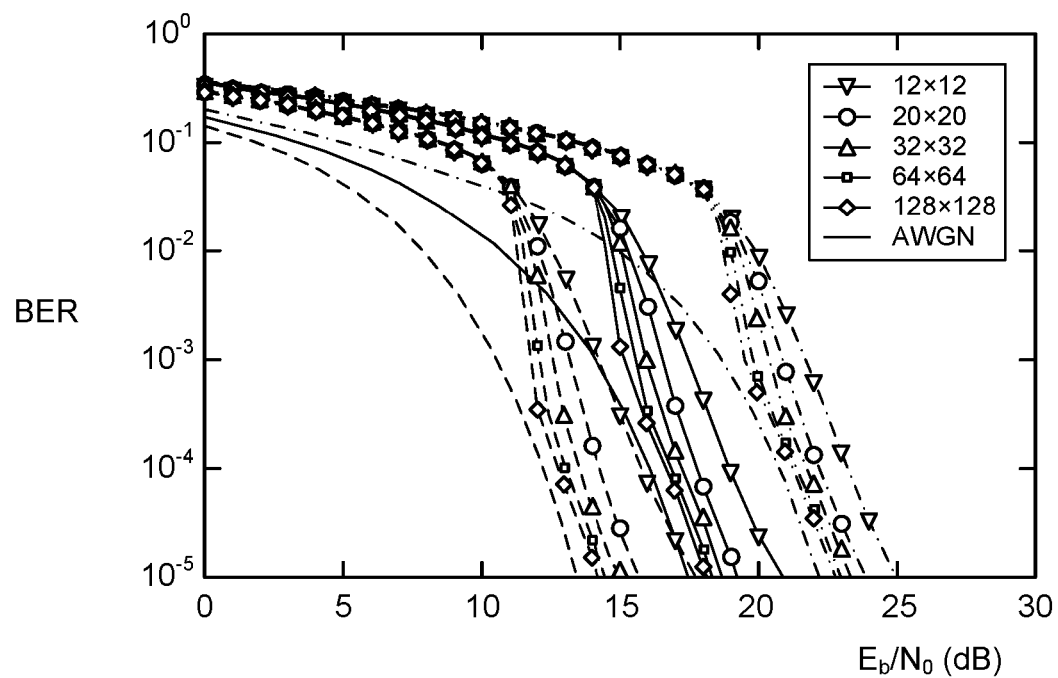
FIG. 9 is a graph illustrating the performance of WLZF-SIC in MIMO fading channels, according to an embodiment of the present invention.

Finally, the WLZF-SIC receiver also offers improved performance in comparison to conventional receivers, as shown by the graphs in FIGS. 8 and 9. In FIGS. 6 to 9, all simulation results were obtained over Rayleigh fading channels with pedestrian mobility.

FIG. 8 compares the performance of WLZF-SIC-based A-QAM receivers with conventional Long Term Evolution (LTE) 4×4 MU-MIMO receivers. For a sub-optimal non-linear SIC receiver, A-QAM (4×4) outperforms LTE (4×4) by around 10 decibels (dB) gain in $E_b/N_o$. A known solution to improve the LTE receiver performance is to employ an optimum receiver, which comes at the cost of significantly higher computational complexity than the sub-optimal receiver. However, an A-QAM receiver with 20×20 MU-MIMO, according to an embodiment of the present invention, outperforms the optimum case of LTE by around 4 dB gain in Eb/No, and at the same time offers a data rate that is four times than that available with the LTE optimal receiver. In addition, the A-QAM receiver with 20×20 MU-MIMO features lower complexity than LTE (4×4) MU-MIMO.

FIG. 9 is a graph illustrating the performance of WLZF-SIC in MIMO fading channels, according to an embodiment of the present invention. Simulation results are plotted in FIG. 9 for 12×12 (users×antennas), 20×20, 32×32, 64×64 and 128×128 MIMO scenarios. As shown in FIG. 9, the performance of a WLZF-SIC receiver, such as the one shown in FIG. 2, approaches the SISO AWGN performance with the increasing number of service antennas and users. This means that the WLZF-SIC receiver is near optimal to A-QAM modulation. Also, with A-QAM modulation, the WLZF-SIC receiver shows fast convergence (2-3 iterations) to the near-optimal point. Hence, the receiver complexity is comparable with the linear zero-forcing receiver. Furthermore, unlike previously-proposed advanced receivers, the WLZF-SIC receiver does not require knowledge of SNR or the power levels of interfering signals, which in practice are difficult or impossible to obtain in a real-world environment, and is robust to channel estimation errors. These advantages make the A-QAM based WLZF-SIC system extremely practical.

Figure 10:
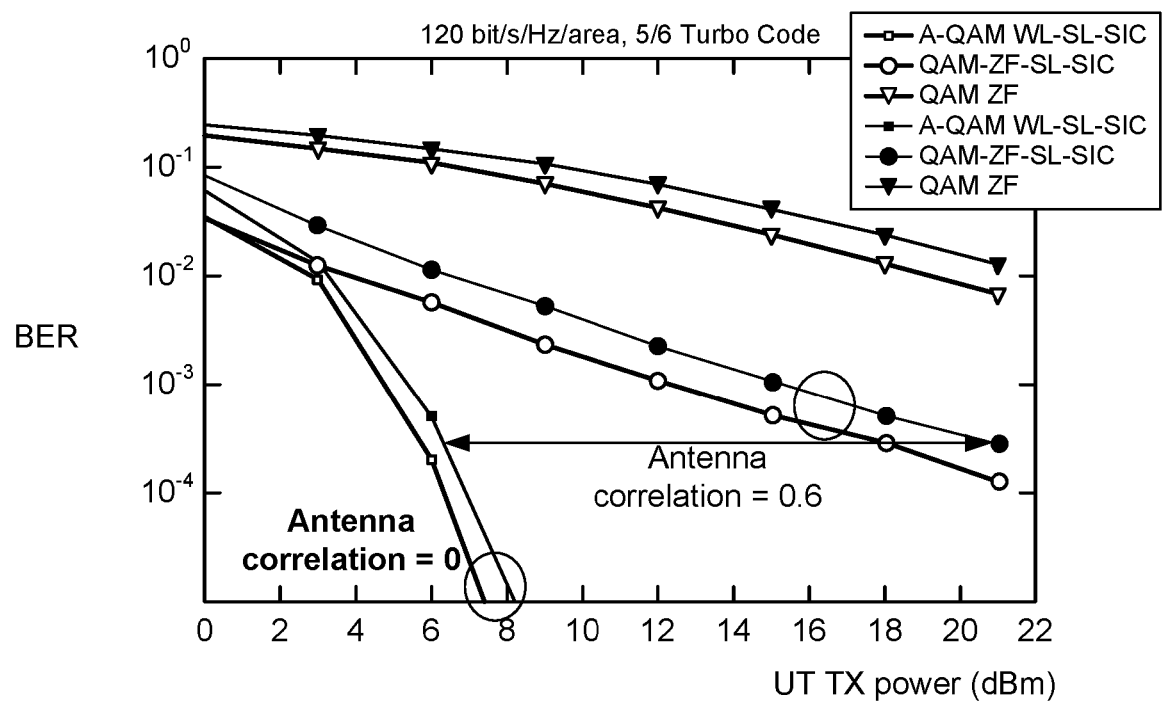
FIG. 10 is a graph illustrating the performance of a receiver using WL-SL-SIC according to an embodiment of the invention in comparison with a conventional QAM receiver.

FIG. 10 is a graph illustrating the performance of WL symbol-level-SIC (WL-SL-SIC) receiver, according to an embodiment of the present invention. Simulation results are plotted for the following system configuration parameters in a multi-cell full co-operation environment:

6 bits/symbol
5/6-rate turbocode
Bandwidth is 20 MHz
Number of cells: 3
Antennas per cell: 8
Number of user terminals: 24
user terminal distribution: uniform
user terminal placement realisations: 4
Intercell distance: 100 m
Scenario: UMi open square
Path loss exponent: 2.8
Shadowing SD: 8.3 dB
Cell height: 10 m
UT height: 1.65 m
Operating frequency: 2 GHz
Noise spectral density: −174 dBm/Hz
Rx correlation factor: 0 or 0.6
Small-scale fading: i.i.d. Rayleigh block fading.

With A-QAM, as in the invention, good BER can be achieved at low transmit power, e.g. BER=1×10$^{-5}$ at 8 dBm. There is a large performance gain when comparing QAM modulations (>14 dB improvement in energy efficiency), and the receiver is less sensitive to receiver antenna correlation.

Whilst certain embodiments of the invention have been described herein with reference to the drawings, it will be understood that many variations and modifications will be possible without departing from the scope of the invention as defined in the accompanying claims.

The invention claimed is:

1. Apparatus for transmitting data in a wireless communication network, the apparatus comprising:
a real modulation branch for modulating a first segment of a bit sequence to obtain a real modulated signal;
a complex modulation branch for modulating a second segment of the bit sequence to obtain a complex modulated signal;
a signal dividing unit configured to divide the bit sequence into a plurality of alternating first segments and second segments, and to send the first segments and the second segments to the real modulation branch and the complex modulation branch respectively; and
a transmitter configured to transmit the real and complex modulated signals,
wherein the real modulation branch is configured to apply a first modulation technique to obtain the real modulated signal and the complex modulation branch is configured to apply a second modulation technique to obtain the complex modulation signal, the second modulation technique being different from the first modulation technique such that the first segment and the second segment are transmitted using different forms of modulation.

2. The apparatus of claim 1, wherein the signal dividing unit is configured to obtain a metric of signal quality for a wireless communication channel between the apparatus and a receiver, and to select a bit length of each of the first segments and a bit length of each of the second segments according to the metric of signal quality.

3. The apparatus of claim 2, wherein the metric of signal quality is a metric of received signal strength.

4. The apparatus of claim 3, wherein the signal dividing unit is configured to select one of a plurality of predefined modulation schemes according to the metric of signal quality, each of the plurality of predefined modulation schemes being associated with a different range of values of the metric of signal quality, and wherein each of the plurality of predefined modulation schemes defines a bit length to be used for each of the first segments and a bit length to be used for each of the second segments.

5. The apparatus of claim 2, wherein the signal dividing unit is configured to select one of a plurality of predefined modulation schemes according to the metric of signal quality, each of the plurality of predefined modulation schemes being associated with a different range of values of the metric of signal quality, and
wherein each of the plurality of predefined modulation schemes defines a bit length to be used for each of the first segments and a bit length to be used for each of the second segments.

6. The apparatus of claim 1, wherein the apparatus is configured to determine an order in which to divide the bit sequence into the first and second segments according to signalling received from the wireless communication network.

7. The apparatus of claim 1, wherein the apparatus is configured to transmit the real and complex modulated signals using time-division multiplexing, by alternately transmitting the real and complex modulated signals in a time domain.

8. The apparatus of claim 1, wherein the apparatus is configured to transmit the real and complex modulated signals using frequency-division multiplexing, by transmitting the real modulated signal and the complex modulated signal on different frequencies.

9. The apparatus of claim 1, wherein the real modulation branch is configured to modulate the first segments of the bit sequence using amplitude shift keying ASK modulation.

10. The apparatus of claim 1, wherein the complex modulation branch is configured to perform quadrature amplitude modulation QAM.

11. The apparatus of claim 1, wherein the wireless communication network comprises:
a plurality of devices each comprising the apparatus according to claim 1, the plurality of devices being arranged into a first group and a second group,
wherein the plurality of devices in the first group are configured to use an inverse order to the plurality of devices in the second group when dividing the bit sequence, such that corresponding parts of respective bit sequences processed by the plurality of devices in the first and second groups are modulated using real modulation by the plurality of devices in the first group and using complex modulation by the plurality of devices in the second group, or using complex modulation by the plurality of devices in the first group and using real modulation by the plurality of devices in the second group.

12. The wireless communication network of claim 11, further comprising:
an access point configured to communicate wirelessly with the plurality of devices,
wherein the access point is configured to assign each device to the first group or the second group, and to notify each device of the first group or the second group to which it is assigned.

13. A method of transmitting data in a wireless communication network, the method comprising:
dividing a bit sequence into a plurality of alternating first segments and second segments;
sending the first segments and the second segments to a real modulation branch and a complex modulation branch respectively, the real modulation branch being configured to modulate the first segments to obtain a real modulated signal and the complex modulation branch being configured to modulate the first segments to obtain a complex modulated signal; and
transmitting the real and complex modulated signals,
wherein the real modulation branch is configured to apply a first modulation technique to obtain the real modulated signal and the complex modulation branch is configured to apply a second modulation technique to obtain the complex modulation signal, the second modulation technique being different from the first modulation technique such that the first segment and the second segment are transmitted using different forms of modulation.

14. A non-transitory computer-readable storage medium arranged to store computer program instructions which, when executed, perform the method of transmitting data in a wireless communication network, the method comprising:
dividing a bit sequence into a plurality of alternating first segments and second segments;
sending the first segments and the second segments to a real modulation branch and a complex modulation branch respectively, the real modulation branch being configured to modulate the first segments to obtain a real modulated signal and the complex modulation branch being configured to modulate the first segments to obtain a complex modulated signal; and
transmitting the real and complex modulated signals,
wherein the real modulation branch is configured to apply a first modulation technique to obtain the real modulated signal and the complex modulation branch is configured to apply a second modulation technique to obtain the complex modulation signal, the second modulation technique being different from the first modulation technique such that the first segment and the second segment are transmitted using different forms of modulation.

* * * * *